(12) United States Patent
He et al.

(10) Patent No.: US 11,055,536 B2
(45) Date of Patent: Jul. 6, 2021

(54) VIDEO FEATURE EXTRACTION METHOD AND DEVICE

(71) Applicant: Beijing Bytedance Network Technology Co., Ltd., Beijing (CN)

(72) Inventors: Yi He, Beijing (CN); Lei Li, Beijing (CN); Cheng Yang, Beijing (CN); Gen Li, Beijing (CN); Yitan Li, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 16/768,527

(22) PCT Filed: Dec. 29, 2018

(86) PCT No.: PCT/CN2018/125499
§ 371 (c)(1),
(2) Date: May 29, 2020

(87) PCT Pub. No.: WO2019/184521
PCT Pub. Date: Oct. 3, 2019

(65) Prior Publication Data
US 2020/0302183 A1  Sep. 24, 2020

(30) Foreign Application Priority Data
Mar. 29, 2018 (CN) .......................... 201810271773.1

(51) Int. Cl.
*G06K 9/00* (2006.01)
(52) U.S. Cl.
CPC ................. *G06K 9/00744* (2013.01)

(58) Field of Classification Search
CPC ............. G06K 9/00744; G06K 9/4661; H04N 21/234; H04N 21/44; H04N 21/2541; H04N 21/2743
See application file for complete search history.

(56) References Cited

U.S. PATENT DOCUMENTS

| 2005/0286774 A1* | 12/2005 | Porikli ............... G06K 9/00711 382/225 |
| 2009/0028517 A1 | 1/2009 | Shen et al. |

(Continued)

FOREIGN PATENT DOCUMENTS

| CN | 101789011 A | 7/2010 |
| CN | 103605786 A | 2/2014 |

(Continued)

OTHER PUBLICATIONS

International Patent Application No. PCT/CN2018/125499; Int'l Search Report; dated Mar. 27, 2019; 2 pages.

*Primary Examiner* — Syed Haider
(74) *Attorney, Agent, or Firm* — BakerHostetler

(57) ABSTRACT

A video feature extraction method and device are provided. The method includes extracting one or more frames from a video object to obtain one or more frames of images, obtaining one or more shift vectors for each of the one or more frames of images, using each of the one or more shift vectors, taking any pixel in each of the one or more frames of images as a starting point, determining a terminal point directed by the one or more shift vectors from the starting point, and determining an image feature of the one or more frames of images according to a difference between the starting point and the terminal point, and determining a video feature of the video object according to the image feature of the one or more frames of images.

17 Claims, 6 Drawing Sheets

Extracting one or more frames from a video object to obtain one or more frames of images — S11

Obtaining one or more shift vectors for each of the frame of image, using each shift vector, taking any pixel in the frame of image as the starting point, determining a pixel at a terminal point directed by the shift vector, and determining the image feature of the frame of image according to the difference between the starting point and the terminal point — S12

Determining a video feature of the video object according to the image feature of each frame of image corresponding to the video object — S13

(56) References Cited

U.S. PATENT DOCUMENTS

| | | | | |
|---|---|---|---|---|
| 2009/0167959 A1* | 7/2009 | Nakamura | ............ | H04N 19/182 |
| | | | | 348/699 |
| 2014/0044361 A1* | 2/2014 | Lee | ........................ | G06K 9/481 |
| | | | | 382/201 |
| 2016/0007058 A1* | 1/2016 | Wang | ................. | G06K 9/00744 |
| | | | | 725/116 |
| 2016/0292510 A1 | 10/2016 | Han et al. | | |

FOREIGN PATENT DOCUMENTS

| | | | |
|---|---|---|---|
| CN | 104020430 | A | 9/2014 |
| CN | 104216949 | A | 12/2014 |
| CN | 104881640 | A | 9/2015 |
| CN | 105574894 | A | 5/2016 |
| CN | 106951484 | A | 7/2017 |
| CN | 107239535 | A | 10/2017 |
| CN | 107452401 | A | 12/2017 |
| CN | 107748750 | A | 3/2018 |

\* cited by examiner

VIDEO FEATURE EXTRACTION METHOD AND DEVICE

CROSS-REFERENCE TO RELATED APPLICATIONS

This application is the U.S. National Stage of International Application No. PCT/CN2018/125499 filed on Dec. 29, 2018, which claims benefit of priority to Chinese Patent Application with the application number 201810271773.1, filed Mar. 29, 2018 the entire content of which is hereby incorporated by reference herein.

TECHNICAL FIELD

The disclosure relates to the technical field of video processing, and more particularly to a video feature extraction method and device.

BACKGROUND ART

In the current multimedia information society, users upload massive videos to a video platform every day. Most of these videos are normal and valuable videos. However, there are also some defective videos. The defective videos mainly include: videos repeated with existing videos in a video database of the platform, videos repeated with videos in a copyright database (such as videos needing royalties) and some videos not suitable for being displayed or forbidden to be displayed. Therefore, it is necessary to quickly compare and filter the massive videos uploaded by the users. The core technology to improve the speed and accuracy of video comparison is to reasonably extract and compare features of video frames and determine similarities.

In order to improve the speed and accuracy of comparison, it is necessary to generate, for one video, a video feature that can characterize the video, so as to determine the similarity of the videos by comparing the video features of two videos. An extraction method of the video features and the excellence degree of the video features determine the efficiency and accuracy of the video comparison.

SUMMARY

The object of the disclosure is to provide a new video feature extraction method and device.

The purpose of the disclosure is realized by the following technical solutions. The video feature extraction method according to the disclosure includes the following steps: extracting one or more frames from a video object to obtain one or more frames of images; using each of the one or more shift vectors, taking any pixel in each of the one or more frames of images as a starting point, determining a terminal point directed by the one or more shift vectors from the starting point, and determining an image feature of the one or more frames of images according to a difference between the starting point and the terminal point; and determining a video feature of the video object according to the image features of the one or more frames of images.

The object of the disclosure can be further achieved by the following technical scheme.

In the forgoing video feature extraction method, a length and a direction of the one or more shift vectors are arbitrary.

In the forgoing video feature extraction method, determining an image feature of the one or more frames of images according to a difference between the starting point and the terminal point includes that determining the difference between each starting point and a corresponding terminal point in one of the one or more frames of images for each of the one or more shift vectors, and determining a feature bit of the one or more frames of images based on an identical shift vector of the one or more shift vectors according to an overall situation of each difference based on the identical shift vector so as to obtain the feature bit of each of the one or more shift vectors; and determining the image feature of the one of the one or more frames of images according to the feature bit of the one of the one or more frames of images based on the one or more shift vectors.

In the forgoing video feature extraction method, obtaining the one or more shift vectors further includes distributing a counter to each of the one or more shift vectors; determining a feature bit of the one of the one or more frames of images based on an identical shift vector of the one or more shift vectors according to an overall situation of each difference based on the identical shift vector includes increasing or reducing a value of the counter corresponding to the one or more shift vectors according to the each difference of the one or more shift vectors, and comparing the value of the counter with a predetermined set value, and determining the feature bit of the one of the one or more frames of images based on the one or more shift vectors according to the comparison result.

In the forgoing video feature extraction method, the difference between the starting point and the terminal point includes a difference between brightness information of the starting point and brightness information of the terminal point.

The purpose of the disclosure is also realized by using the following technical solutions. The video feature library construction method includes the following steps: extracting a video feature of a video object according to any one of the foregoing video feature extraction method, and storing the video feature into a video feature library.

The purpose of the disclosure is also realized by using the following technical solutions. A video feature extraction device according to the disclosure includes a frame extractor configured for extracting one or more frames from a video object to obtain one or more frames of images, an image feature determiner configured for obtaining one or more shift vectors for each of the one or more frames of images, using each of the one or more shift vectors, taking any pixel in each of the one or more frames of images as a starting point, determining a terminal point directed by the one or more shift vectors from the starting point, and determining an image feature of the one or more frames of images according to a difference between the starting point and the terminal point; and a video feature determiner configured for determining a video feature of the video object according to the image feature of the one or more frames of images.

The purpose of the disclosure can be further realized by using the following technical scheme.

The video feature extraction device further includes a module for executing the step of any video feature extraction method aforementioned.

The object of the disclosure is also realized by the following technical solutions. An audio fingerprint library construction device according to the disclosure, includes a video feature extractor configured for extracting video features of video objects according to any one the foregoing video feature extraction method; a video feature memory configured for storing the video features into a video feature library; and the video feature library configured for storing the video features.

The object of the disclosure is also realized by the following technical solutions. A video feature extraction hardware device according to the disclosure includes a memory configured for storing non-transitory computer readable instructions; and a processor, configured for executing the computer readable instructions such that the processor performs any of the foregoing video feature extraction methods.

The object of the disclosure is also realized by the following technical solutions. A computer readable storage medium according to the disclosure configured for storing non-transitory computer readable instructions, when the non-transitory computer readable instructions are executed by a computer, causes the computer to perform any of the aforementioned video feature extraction methods.

The object of the disclosure is also realized by the following technical solutions. A terminal device according to the disclosure includes any of the foregoing video feature extraction devices.

The above description is only an overview of the technical solution of the disclosure, in order to more clearly understand the technical means of the disclosure, it can be implemented in accordance with the contents of the specification, the above and other objects, features and advantages of the disclosure will become more apparent and understood, the following is a detailed description of the preferred embodiment, and with reference to the accompanying drawings.

DETAILED DESCRIPTION

In order to further expound the technical means and efficacy taken by the disclosure for achieving the purpose of the disclosure, the detailed description of the video feature extraction method and device according to the disclosure, the structure, the features and the effects thereof are described in detail in conjunction with the accompanying drawings and the preferred embodiments.

Figure 1:
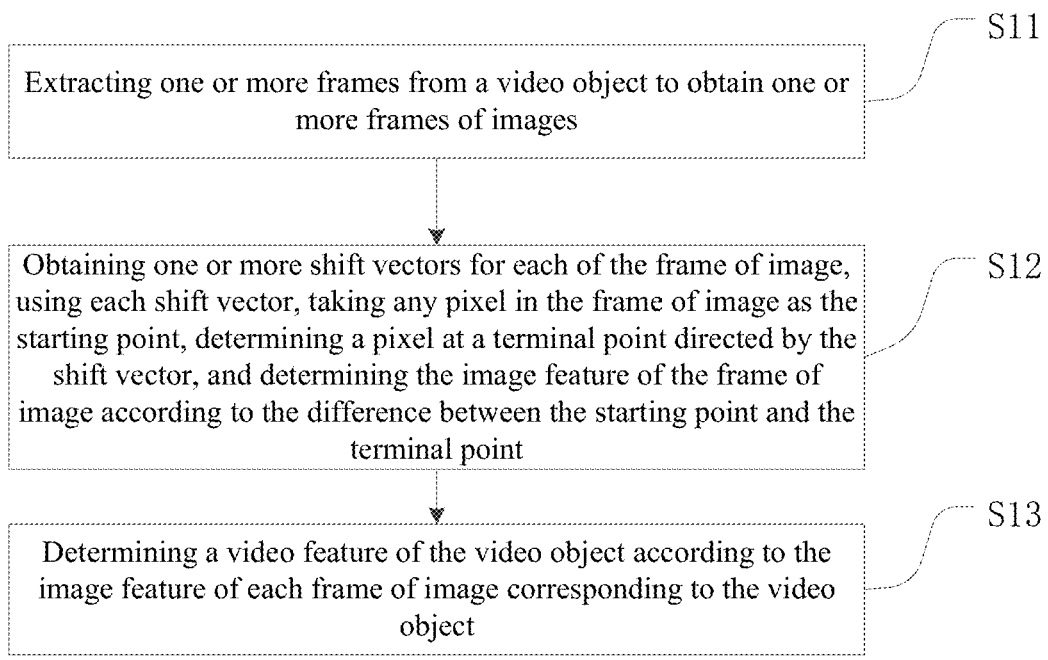
FIG. 1 is a flow block diagram of a video feature extraction method according to one embodiment of the disclosure.
Figure 2:
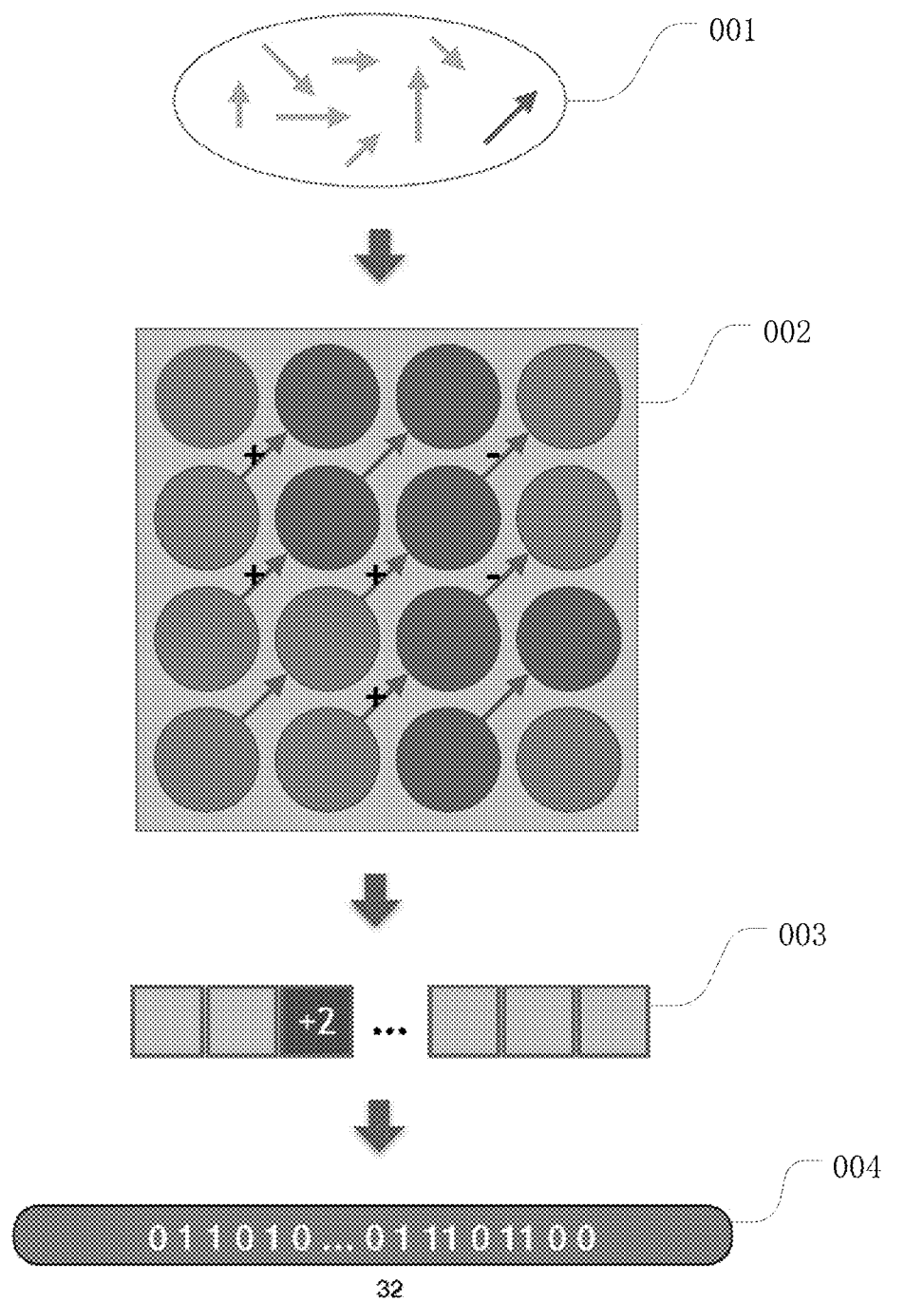
FIG. 2 is a flowchart of the video feature extraction method provided by one embodiment of the disclosure.

FIG. 1 is a schematic block diagram of a video feature extraction method according to an embodiment of the disclosure. FIG. 2 is a schematic flow diagram of a video feature extraction method according to an embodiment of the disclosure. Referring to FIG. 1 and FIG. 2, a video feature extraction method according to an example of the disclosure mainly includes the following steps.

Step S11, one or more frames are extracted from a video object (for example, a section of video signals or a video file) to obtain one or more frames of images. The specific number of the extracted frames of images may be set/disposed; for example, two frames of images can be extracted from the video in each second, or one frame of image can be extracted from the video in each second. It is noted that the frame extraction can be performed uniformly; that is, the time interval between two adjacent frames of images is consistent. Thereafter, the process proceeds to step S12.

Step S12, for each frame of image, one or more shift vectors are obtained, and the number of the obtained shift vectors is assumed to be N, where N is a positive integer. Each shift vector is used, with any pixel in the frame of image as a starting point, to determine a pixel at a terminal point from the starting point directed by the shift vector. The image feature of the frame of image can be determined according to the difference between the starting point and the corresponding terminal point. Thereafter, the process proceeds to step S13.

Specifically, the N shift vectors can be preset or randomly generated. The obtained shift vector is shown as 001 in FIG. 2. Further, the length and direction of each shift vector are arbitrary. In addition, the shift vectors are mutually independent and do not need any correlation. It is noted that, for the frames of images obtained by extracting frames, the image feature of each frame of image can be generally determined by using the same group of shift vectors; however, different groups of shift vectors can likewise be used for respectively determining the image features of each frame image.

It should be noted that, by taking any pixel as the starting point, all pixels in the frame of image can be defined as the starting points, or the pixels in one or more preset positions in the frame of image can be defined as the starting points, and the specific position can be arbitrary; for example, all points not located on the edge in one frame of image can be taken as starting points.

In a specific example of the disclosure, in the process of determining an image feature of a frame of image, using each shift vector, each pixel in the frame of image is taken as a starting point; the difference between each pixel at the starting point and the corresponding pixel at the terminal point is traversed; the feature bit of the frame of image based on the shift vector is determined according to the overall situation of each difference condition based on the same shift vector so as to obtain the feature bit of each shift vector. In one example, the difference conditions based on the same shift vector can be summed to determine the overall condition of each difference condition. Then, according to the feature bit corresponding to the obtained N shift vectors, an image feature (which may also be referred to as a video feature singleton) whose length is N corresponding to the frame of image is determined. The obtained image feature whose length is N is shown as 004 in FIG. 2.

In some embodiments of the disclosure, the difference between the starting point and the terminal point includes the difference between the brightness information of the pixel at the starting point and the brightness information of the pixel at the terminal point.

Step S13, a video feature of the video object is determined according to image features of each frame of image corresponding to the video object. Specifically, the image features can be arranged according to the time sequence of the corresponding frames of images to obtain an image feature sequence, and the image feature sequence is determined as a video feature.

In the video feature extraction method in the disclosure, the pixel at the starting point/starting point pixel and the pixel at the terminal point/terminal point pixel in the frame the image extracted from the video object are determined according to the shift vector with random length and direction, and the difference situation between the starting point pixel and the terminal point pixel is compared to generate the video feature, so that the accuracy and the extraction efficiency of the video feature extraction can be improved, and the performance of the obtained video feature can be improved. As a result, the video comparison, video retrieval, video deduplication, and video content monitoring based on the video features obtained by the video feature extraction method of the disclosure can acquire higher accuracy and efficiency.

Figure 3:
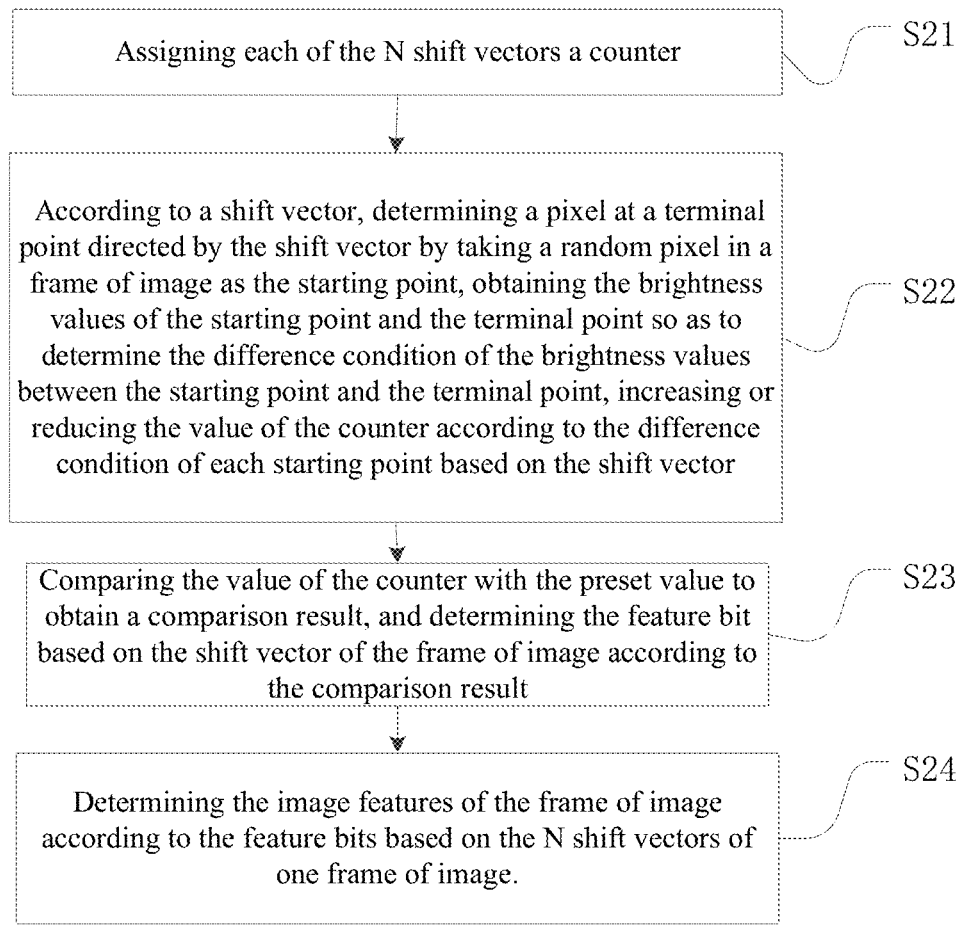
FIG. 3 is a flow block diagram of the process of determining the image features of a frame of image provided by one embodiment of the disclosure.

FIG. 3 is a schematic flow diagram of determining an image feature of a frame of image provided by an embodiment of a video feature extraction method according to the disclosure. Referring to FIG. 2 and FIG. 3, in an embodiment of the disclosure, the specific process of determining one image feature of a frame of image by using N shift vectors in step S12 includes following steps.

Step S21, each of the N shift vectors is assigned a counter. Thereafter, the process proceeds to step S22.

Step S22, according to a shift vector, with respect to any pixel in a frame of image, the pixel is taken as a starting point to determine the pixel at the terminal point directed by the shift vector can be determined, and the brightness value of the starting point and that of the terminal point are obtained so as to determine the difference condition of the brightness values between the starting point and the terminal point; for example, the difference conditions contain the two conditions of the starting point brighter than the terminal point and the terminal point brighter than the terminal point, and the value of the counter corresponding to the shift vector is increased or reduced according to the difference condition of each starting point based on the shift vector. Thereafter, the process proceeds to step S23.

Specifically, as 002 shown in FIG. 2, in one example, any pixel of the frame of image serves as a starting point, according to a shift vector (the rightmost shift vector in 001 of FIG. 2 is taken), the terminal point directed by each starting point can be determined. The brightness value of the starting point and the brightness value of the corresponding terminal point are compared, and if the brightness value of the starting point is larger than the brightness value of the terminal point (as shown in FIG. 2, the starting point is lighter than the terminal point), the value of the counter is +1; otherwise, if the brightness value of the starting point is smaller than the brightness value of the terminal point (as the starting point is darker than the terminal point shown in FIG. 2), the value of the counter is −1. The conditions of all the pixels are counted, and the value of the counter is increased or decreased, and the obtained counter is shown as 003 in FIG. 2.

It should be noted that if the terminal point of the shift vector exceeds the range of the frame of image, the value of the counter can be unchanged, or the frame of image can be periodically extended; the frame of image is surrounded by identical images to ensure a corresponding pixel existing at the terminal point of the shift vector.

Step S23, the value of the counter and the preset value are compared to obtain a comparison result, and the feature bit based on the shift vector of the frame of image can be determined according to the comparison result. Thereafter, the process proceeds to step S24.

Specifically, the set value can be preset to be 0; whether the value of the counter is larger than a predetermined set value or not is judged, if the value of the counter is larger than the set value, a feature bit whose value is 1 is generated; otherwise, a feature bit whose value is 0 is generated. As 003 and 004 shown in FIG. 2, if the value of the counter is +2, a feature bit whose value is 1 is correspondingly generated.

Step S24, the image features of the frame of image can be determined according to the feature bits based on the N shift vectors of one frame of image. The obtained image feature is shown as 004 in FIG. 2.

It should be noted that the change rule of the increase and decrease of the counter in step S22 is not limited to the manner in the foregoing embodiment; for example, the value of the counter can +1 when the brightness value of the starting point is smaller than the brightness value of terminal point; otherwise, the value of the counter is −1. In addition, for the case when the brightness values of the start point and the terminal point are equal, it can uniformly set the value of the counter +1, or can uniformly set the value of the counter −1, or can uniformly set the value of the counter unchanged. Similarly, for step S23, the value of the feature bit can be determined in other manners; for example, according to the counter after changing the value in step S22, if the value of the counter is smaller than 0, a feature bit whose value is 1 is generated; otherwise, a feature bit whose value is 0 is generated.

Figure 4:
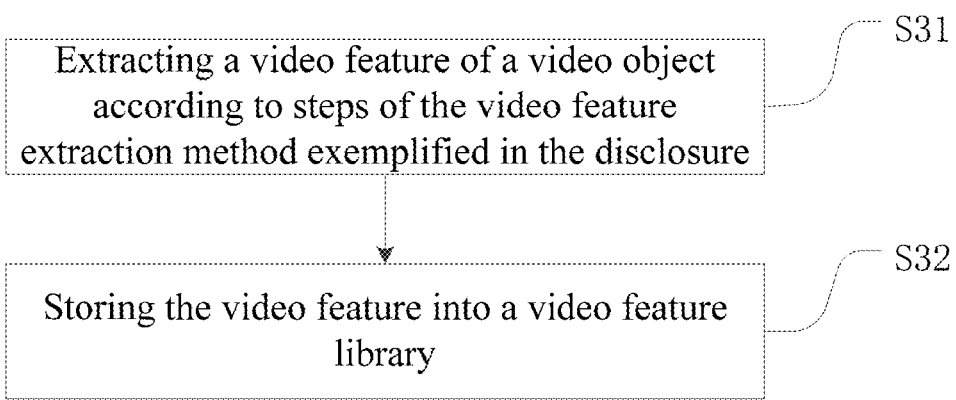
FIG. 4 is a flow block diagram of a video feature library construction method according to one embodiment of the disclosure.

FIG. 4 is a schematic flowchart of an embodiment of a video feature library construction method according to the disclosure. Referring to FIG. 4, a method for constructing a video feature library according to an example of the disclosure mainly includes the following steps.

Step S31, a video feature of a video object is extracted according to the steps of the foregoing video feature extraction method exemplified in the disclosure. Then, the process will be advanced to step S32.

Step S32, the video feature of the video object is stored into a video feature library.

It should be noted that the video features in one video feature library should be obtained according to the same feature extraction method. That is, in the process of video feature extraction in step S31, frame selection is performed based on the same method in step S11, and the same shift vector is obtained and the image feature is determined based on the same method in step S12, and the video features are determined based on the same method in step S13. In addition, as time goes on, the video feature library may be updated at any time.

Figure 5:
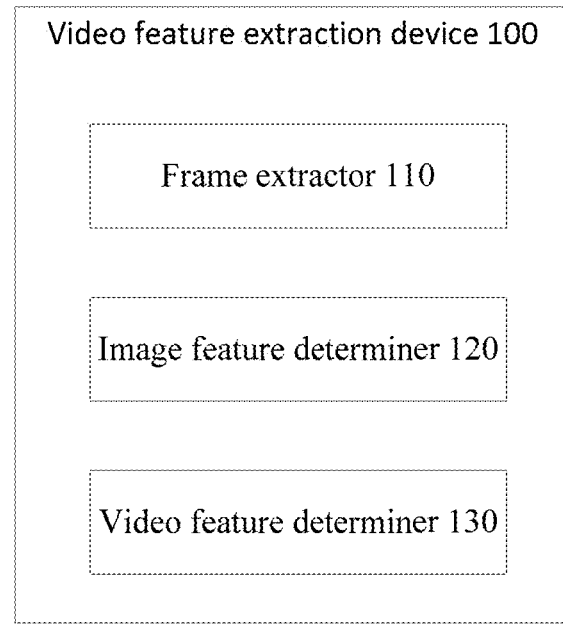
FIG. 5 is a structural block diagram of a video feature extraction device according to one embodiment of the disclosure.

FIG. 5 is a schematic structural block diagram of an embodiment of a video feature extraction apparatus according to the disclosure. Referring to FIG. 5, the video feature extraction apparatus/device 100 of the disclosure mainly includes a frame extractor 110 configured for carrying out frame extraction on a video object to obtain one or more frames of images, an image feature determiner 120 configured for obtaining one or more shift vectors for each frame of image, using each shift vector, taking any pixel in the frame of image as a starting point, determining a pixel at a terminal point directed by the shift vector from the starting point, and determining an image feature of the frame of image according to the difference between the starting point and the terminal point, a video feature determiner 130 configured for determining video features of the video object according to image features of each frame of image corresponding to the video object.

Figure 6:
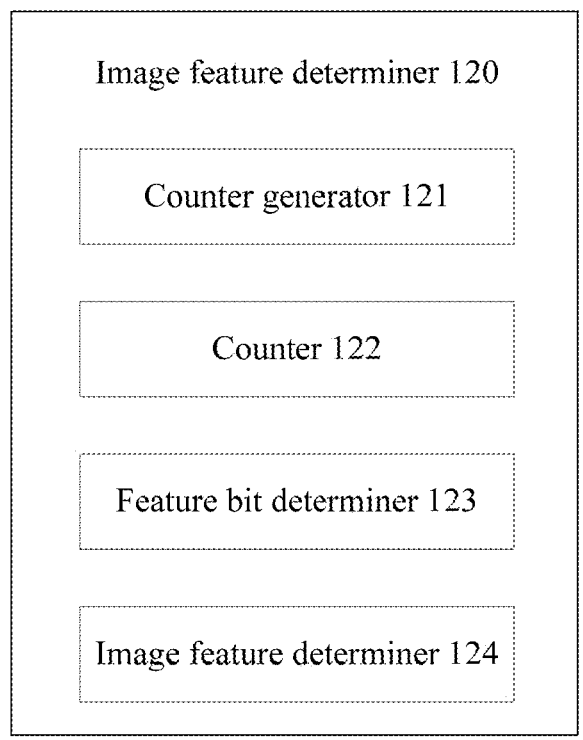
FIG. 6 is a structural block diagram of an image feature determiner according to one embodiment of the disclosure.

FIG. 6 is a schematic structural block diagram of an image feature determiner 120 provided by one embodiment of a video feature extraction apparatus according to the disclosure. Referring to FIG. 6, in one embodiment of the disclosure, the image feature determiner 120 specifically includes a counter generating unit/counter generator 121 configured for allocating a counter for each of the N shift vectors, a counting unit/counter 122 configured for determining a pixel at a terminal point directed by a shift vector by taking any pixel in a frame of image as a starting point, and obtaining the brightness value of the starting point and that of the terminal point so as to determine the difference condition of the brightness values between the starting point and the terminal point, and increasing or reducing the value of the counter corresponding to the shift vector according to the difference condition of each starting point based on the shift vector, a feature bit determination unit/determiner 123 configured for comparing the value of the counter with a predetermined set value to obtain a comparison result, and determining the feature bit based on the shift vector of the frame of image according to the comparison result, an image feature determination unit/determiner 124 configured for determining image features of the frame of image according to the feature bits based on the N shift vectors of one frame of image.

Figure 7:
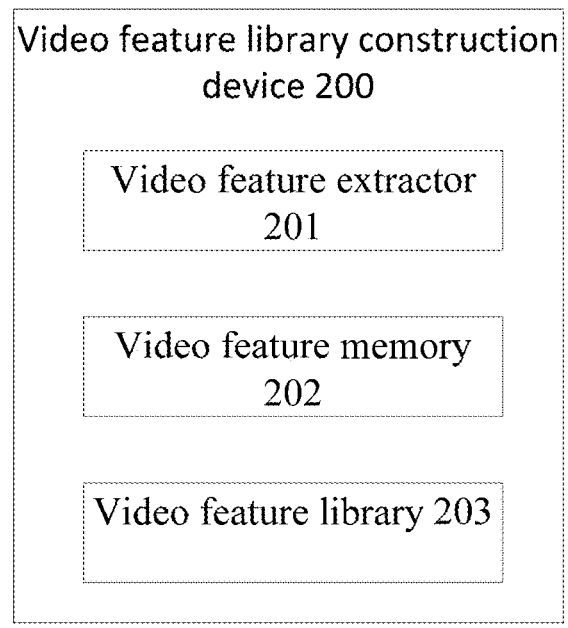
FIG. 7 is a structural block diagram of a video feature library construction device according to one embodiment of the disclosure.

FIG. 7 is a schematic structural diagram of one embodiment of a video feature library construction device of the disclosure. Referring to FIG. 7, the video feature library construction device 200 exemplified in the disclosure mainly includes a video feature extractor 201 configured for extracting video features of video objects according to the steps of the foregoing video feature extraction method of the disclosure a video feature memory 202 configured for storing the video features into a video feature library, and a video feature library 203 configured for storing the video features of the various video objects.

The video feature extractor 201 includes the frame extractor 110, the image feature determiner 120 and the video feature determiner 130 of the foregoing video feature extraction device exemplified in the disclosure.

Figure 8:
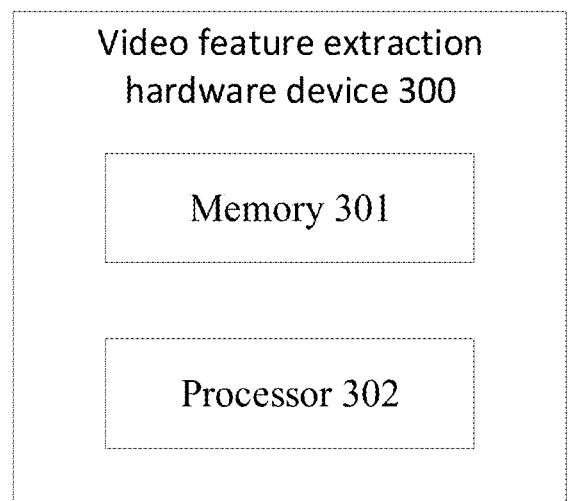
FIG. 8 is a hardware block diagram of a video feature extraction hardware device according to one embodiment of the disclosure.

FIG. 8 is a hardware block diagram illustrating a video feature extraction hardware device according to an embodiment of the disclosure. As shown in FIG. 8, a video feature extraction hardware device 300 comprises a memory 301 and a processor 302. The components in video feature extraction hardware device 300 are interconnected by a bus system and/or other form of connection mechanism (not shown).

The memory 301 is configured for storing non-transitory computer readable instructions. In particular, the memory 301 may include one or more computer program products that may comprise various forms of computer readable storage media such as volatile memory and/or nonvolatile memory. The volatile memory may include, for example, random access memory (RAM) and/or cache memory (cache) and the like. The nonvolatile memory may include, for example, a read-only memory (ROM), a hard disk, a flash memory, etc.

The processor 302 may be a central processing unit (CPU) or other form of processing unit with data processing capabilities and/or instruction execution capabilities, and may control the other components in the video feature extraction hardware device 300 to perform the desired functions. In one embodiment of the disclosure, the processor 302 is configured for running the computer readable instructions stored in the memory 301 such that the media features are all or a part of the steps of the method of the video feature extraction of the embodiments of the disclosure described above with respect to the hardware device 300.

Figure 9:
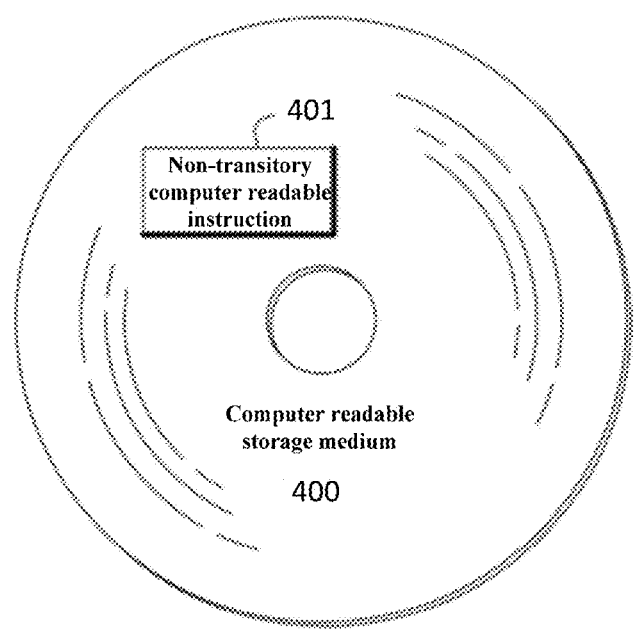
FIG. 9 is a schematic diagram of a computer readable storage medium according to one embodiment of the disclosure.

FIG. 9 is a schematic diagram illustrating a computer readable storage medium according to an embodiment of the disclosure. As shown in FIG. 9, according to the computer readable storage medium 400 according to the embodiment of the disclosure, a non-transitory computer readable instruction 401 is stored thereon; when the non-transitory computer readable instruction 401 is executed by a processor, all or a part of the steps of the method for the video feature extraction of various embodiments of the disclosure are executed.

Figure 10:
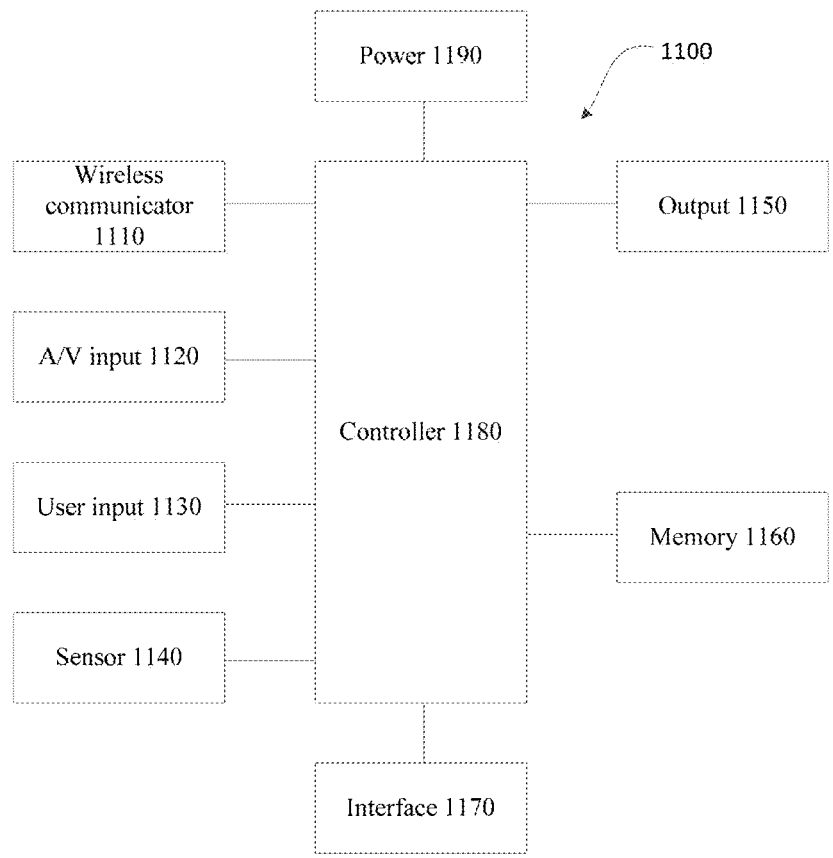
FIG. 10 is a structural block diagram of a terminal equipment according to one embodiment of the disclosure.

FIG. 10 is a schematic diagram illustrating a hardware structure of a terminal device according to an embodiment of the disclosure. A terminal device may be implemented in a variety of forms. The terminal devices in the disclosure may include, but are not limited to, mobile terminal devices such as mobile phones, smart phones, notebook computers, digital broadcast receivers, PDA (personal digital assistants), PAD (tablet computers), PMP (portable multimedia players), navigation devices, vehicle-mounted terminal devices, vehicle-mounted display terminals, vehicle-mounted electronic rearview mirrors, and the like, and fixed terminal devices such as digital TV, desktop computers, and the like.

As shown in FIG. 10, the terminal device 1100 may include a wireless communication unit 1110, an A/V (audio/video) input unit 1120, an user input unit 1130, a sensing unit 1140, an output unit 1150, a memory 1160, an interface unit 1170, a controller 1180, and a power unit 1190. FIG. 10 illustrates a terminal device with various components, but it should be understood that all illustrated components are not required to be implemented. More or fewer components may be implemented instead.

The wireless communication unit 1110 enables radio communication between the terminal device 1100 and a wireless communication system or network. The A/V input unit 1120 is configured to receive audio or video signals. The user input unit 1130 may generate key input data according to a command input by the user to control various operations of the terminal device. The sensing unit 1140 detects the current state of the terminal device 1100, the position of the terminal device 1100, the orientation of the user on the touch input of the terminal device 1100, the orientation of the terminal device 1100, the acceleration or deceleration movement of the terminal device 1100, and the like, and generates a command or signal for controlling the operation of the terminal device 1100. The interface unit 1170 serves as an interface for connecting the at least one external device with the terminal device 1100. The output unit 1150 is configured to provide an output signal in a visual, audio and/or haptic manner. The memory 1160 may store software programs, such as processing and control operations, executed by the controller 1180, or may temporarily store data to be output or output to be output. The memory 1160 may include at least one type of storage medium. Moreover, the terminal device 1100 can cooperate with a network storage device that performs storage functions of the memory 1160 through a network connection. The controller 1180 typically controls the overall operation of the terminal device. In addition, the controller 1180 may include a multimedia module for reproduction or playback of multimedia data. The controller 1180 may perform pattern recognition processing to identify handwritten input or image draw inputs that are performed on the touch screen as characters or images. The power supply unit 1190 receives external power or internal power under the control of the controller 1180 and provides appropriate electrical power required to operate the elements and components.

The various embodiments of the video feature extraction method of the disclosure may be implemented using a computer readable medium such as computer software, hardware, or any combination thereof. For a hardware implementation, various embodiments of the video feature extraction method presented herein may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. The various embodiments of the video feature extraction method proposed by the disclosure can be implemented in the controller 1180. For a software implementation, various embodiments of the video feature extraction method proposed by the disclosure may be implemented with separate software modules that allow at least one function or operation to be performed. The software codes can be implemented by software applications (or programs) written in any suitable programming language, which can be stored in the memory 1160 and executed by the controller 1180.

Above, a video feature extraction method, apparatus, hardware device, computer readable storage medium, and terminal device according to an embodiment of the disclosure, the multiple types of pooling are performed stage by stage on the frame images that are obtained by the video frame selection to generate the video feature, so that the accuracy of video feature extraction and the extraction efficiency may be greatly improved, and the excellence degree and the robustness of the obtained video feature may be increased. Further, the video feature obtained by the video feature extraction method of the disclosure has higher accuracy, higher efficiency, and better robustness for video comparison, video retrieval, video deduplication, and video content monitoring.

The basic principle of the disclosure is described above with reference to specific embodiments, but it should be noted that the merits, advantages, effects and the like mentioned in the disclosure are merely examples and are not intended to be limiting, and these merits, advantages, effects, and the like are not considered to be possessed by various embodiments of the disclosure. In addition, the specific details disclosed above are for illustration purposes only and are not intended to be limiting, and the details are not limited thereto.

The block diagrams of components, apparatus, devices and systems involved in the disclosure are merely illustrative examples and are not intended to require or imply that connection, arrangement, and configuration must be performed in a manner shown in a block diagram. As will be recognized by those skilled in the art, the components, apparatus, devices and systems can be connected and arranged in any manner. Words such as "including", "comprising", "having", and the like are open words, refer to "including but not limited to," and may be used interchangeably. The terms "or" and "and" as used herein refer to the terms "and/or" and may be used interchangeably unless the context clearly indicates otherwise. As used herein, the term "such as" refers to the phrase "such as, but not limited to," and may be used interchangeably.

In addition, as used herein, "or" is used in the enumeration of items starting with "at least one" to indicate a separate enumeration such that, for example, the enumeration of at least one of A, B, or C means A or B or C, or AB or AC or BC, or ABC (ie, A, B, and C). Furthermore, the term "exemplary" does not mean that the described example is preferred or better than other examples.

It should also be noted that, in the systems and methods of the disclosure, various components or steps may be decomposed and/or recombined. These decompositions and/or recombination should be considered as an equivalent scheme of the disclosure.

Various changes, substitutions and alterations of the techniques described herein may be made without departing from the teachings of the teachings defined by the appended claims. Furthermore, the scope of the claims of the disclosure is not limited to the specific aspects of the processing, machines, manufacture, events, means, methods, and acts described above. The presently existing or later-to-be-developed processes, machines, manufacture, events, compositions, means, methods, or acts may be developed that substantially the same function or achieve substantially the same result as the respective aspects described herein. Accordingly, the appended claims are intended to include within their scope such processes, machines, manufacture, compositions of matter, means, methods, or actions.

The above description of the disclosed aspects is provided to enable any person skilled in the art to make or use the disclosure. Various modifications to these aspects will be readily apparent to those skilled in the art, and the generic principles defined herein may be applied to other aspects without departing from the scope of the disclosure. Thus, the disclosure is not intended to be limited to the aspects shown herein but is to be accorded the widest scope consistent with the principles and novel features disclosed herein.

The foregoing description has been presented for purposes of illustration and description. Furthermore, this description is not intended to limit embodiments of the disclosure to the form disclosed herein. While various exemplary aspects and embodiments have been discussed above, those skilled in the art will recognize certain variations, modifications, changes, additions, and sub-combinations thereof.

The invention claimed is:

1. A video feature extraction method, comprising:
    extracting one or more frames from a video object to obtain one or more frames of images;
    obtaining one or more shift vectors for each of the one or more frames of images, using each of the one or more shift vectors, taking any pixel in each of the one or more frames of images as a starting point, determining a terminal point directed by the one or more shift vectors from the starting point, and determining an image feature of the one or more frames of images according to a difference between the starting point and the terminal point, wherein the determining an image feature of the one or more frames of images according to a difference between the starting point and the terminal point further comprises:
        determining the difference between each starting point and a corresponding terminal point in one of the one or more frames of images for each of the one or more shift vectors, and determining a feature bit of the one of the one or more frames of images based on an identical shift vector of the one or more shift vectors according to an overall situation of each difference based on the identical shift vector so as to obtain the feature bit of each of the one or more shift vectors, and determining the image feature of the one of the one or more frames of images according to the feature bit of the one of the one or more frames of images based on the one or more shift vectors; and determining a video feature of the video object according to the image feature of the one or more frames of images.

2. The video feature extraction method according to claim 1, wherein a length and a direction of the one or more shift vectors are arbitrary.

3. The video feature extraction method according to claim 2, wherein the difference between the starting point and the terminal point comprises a difference between brightness information of the starting point and brightness information of the terminal point.

4. The video feature extraction method according to claim 1, wherein the obtaining one or more shift vectors further comprises distributing a counter to each of the one or more shift vectors;

wherein the determining a feature bit of the one of the one or more frames of images based on an identical shift vector of the one or more shift vectors according to an overall situation of each difference based on the identical shift vector comprises:

increasing or reducing a value of the counter corresponding to the one or more shift vectors according to the each difference of the one or more shift vectors; and comparing the value of the counter with a predetermined set value, and determining the feature bit of the one of the one or more frames of images based on the one or more shift vectors according to the comparison result.

5. The video feature extraction method according to claim 4, wherein the difference between the starting point and the terminal point comprises a difference between brightness information of the starting point and brightness information of the terminal point.

6. The video feature extraction method according to claim 1, wherein the difference between the starting point and the terminal point comprises a difference between brightness information of the starting point and brightness information of the terminal point.

7. The video feature extraction method according to claim 1, wherein the difference between the starting point and the terminal point comprises a difference between brightness information of the starting point and brightness information of the terminal point.

8. A device of extracting video feature, comprising:
at least one processor; and
at least one memory communicatively coupled to the at least one processor and storing instructions that upon execution by the at least one processor cause the device to:
extract one or more frames from a video object to obtain one or more frames of images;
obtain one or more shift vectors for each of the one or more frames of images, use each of the one or more shift vectors, take any pixel in each of the one or more frames of images as a starting point, determine a terminal point directed by the one or more shift vectors from the starting point, and determine an image feature of the one or more frames of images according to a difference between the starting point and the terminal point, wherein the instruction that upon execution causes the device to determine an image feature of the one or more frames of images according to a difference between the starting point and the terminal point further comprises instructions that upon execution by the at least one processor cause the device to:

determine the difference between each starting point and a corresponding terminal point in one of the one or more frames of images for each of the one or more shift vectors, and determine a feature bit of the one of the one or more frames of images based on an identical shift vector of the one or more shift vectors according to an overall situation of each difference based on the identical shift vector so as to obtain the feature bit of each of the one or more shift vectors, and determine the image feature of the one of the one or more frames of images according to the feature bit of the one of the one or more frames of images based on the one or more shift vectors; and determine a video feature of the video object according to the image feature of the one or more frames of images.

9. The device according to claim 8, wherein a length and a direction of the one or more shift vectors are arbitrary.

10. The device according to claim 8, wherein the instruction that upon execution causes the device to determine an image feature of the one or more frames of images according to a difference between the starting point and the terminal point further comprises instructions that upon execution by the at least one processor cause the device to:

determine the difference between each starting point and a corresponding terminal point in one of the one or more frames of images for each of the one or more shift vectors, and determine a feature bit of the one of the one or more frames of images based on an identical shift vector of the one or more shift vectors according to an overall situation of each difference based on the identical shift vector so as to obtain the feature bit of each of the one or more shift vectors; and determine the image feature of the one of the one or more frames of images according to the feature bit of the one of the one or more frames of images based on the one or more shift vectors;

wherein the instruction that upon execution causes the device to obtain one or more shift vectors further comprises instructions that upon execution by the at least one processor cause the device to distribute a counter to each of the one or more shift vectors;

wherein the instruction that upon execution causes the device to determine the feature bit of the one of the one or more frames of images based on the identical shift vector of the one or more shift vectors according to the overall situation of the each difference based on the identical shift vector further comprises instructions that upon execution by the at least one processor cause the device to:

increase or reduce a value of the counter corresponding to the one or more shift vectors according to the each difference of the one or more shift vectors; and compare the value of the counter with a predetermined set value, and determine the feature bit of the one of the one or more frames of images based on the one or more shift vectors according to the comparison result.

11. A non-transitory computer readable storage medium, configured for storing non-transitory computer readable instructions, when the non-transitory computer readable instructions are executed by a computer, causing the computer to perform operations, the operations comprising:

extracting one or more frames from a video object to obtain one or more frames of images;

obtaining one or more shift vectors for each of the one or more frames of images, using each of the one or more shift vectors, taking any pixel in each of the one or more frames of images as a starting point, determining a terminal point directed by the one or more shift vectors from the starting point, and determining an image feature of the one or more frames of images according to a difference between the starting point and the terminal point, wherein the determining an image feature of the one or more frames of images according to a difference between the starting point and the terminal point further comprises:

determining the difference between each starting point and a corresponding terminal point in one of the one or more frames of images for each of the one or more shift vectors, and determining a feature bit of the one of the one or more frames of images based on an identical shift vector of the one or more shift vectors according to an overall situation of each difference based on the identical shift vector so as to obtain the feature bit of each of the one or more shift vectors, and determining the image feature of the one of the one or more frames of images according to the feature bit of the one of the one or more frames of images based on the one or more shift vectors; and determining a video feature of the video object according to the image feature of the one or more frames of images.

12. The non-transitory computer readable storage medium according to claim 11, wherein a length and a direction of the one or more shift vectors are arbitrary.

13. The non-transitory computer readable storage medium according to claim 12, wherein the difference between the starting point and the terminal point comprises a difference between brightness information of the starting point and brightness information of the terminal point.

14. The non-transitory computer readable storage medium according to claim 11, wherein the obtaining one or more shift vectors further comprises distributing a counter to each of the one or more shift vectors;

wherein the determining the feature bit of the one of the one or more frames of images based on the identical shift vector of the one or more shift vectors according to the overall situation of the each difference based on the identical shift vector comprises:

increasing or reducing a value of the counter corresponding to the one or more shift vectors according to the each difference of the one or more shift vectors; and comparing the value of the counter with a predetermined set value, and determining the feature bit of the one of the one or more frames of images based on the one or more shift vectors according to the comparison result.

15. The non-transitory computer readable storage medium according to claim 14, wherein the difference between the starting point and the terminal point comprises a difference between brightness information of the starting point and brightness information of the terminal point.

16. The non-transitory computer readable storage medium according to claim 11, wherein the difference between the starting point and the terminal point comprises a difference between brightness information of the starting point and brightness information of the terminal point.

17. The non-transitory computer readable storage medium according to claim 11, wherein the difference between the starting point and the terminal point comprises a difference between brightness information of the starting point and brightness information of the terminal point.

\* \* \* \* \*